United States Patent [19]

Lynn

[11] 3,829,553
[45] Aug. 13, 1974

[54] PROCESS FOR TREATING BOROCALCIC ORES

[75] Inventor: Lawrence Lynn, Houston, Tex.

[73] Assignee: General Crude Oil & Minerals Company, S.A., Houston, Tex.

[22] Filed: Aug. 2, 1972

[21] Appl. No.: 277,347

[52] U.S. Cl. ............... 423/279, 23/277, 423/471, 423/497, 423/637
[51] Int. Cl. ..... C01b 35/00, C01c 1/16, C01f 11/02
[58] Field of Search ........... 423/276, 277, 279, 470, 423/471, 497, 637, 280, 282; 23/277

[56] References Cited
UNITED STATES PATENTS

| | | | |
|---|---|---|---|
| 1,359,097 | 11/1920 | Nishigawa | 423/470 |
| 1,573,259 | 2/1926 | Lowry | 423/279 |
| 1,733,537 | 10/1929 | Hellmers | 423/282 |
| 2,749,215 | 6/1956 | Callis | 423/497 |
| 3,018,163 | 1/1962 | May et al. | 423/282 |

Primary Examiner—Oscar R. Vertiz
Assistant Examiner—Hoke S. Miller
Attorney, Agent, or Firm—Paul E. Harris

[57] ABSTRACT

Borax is produced by reacting carbon dioxide, sea water and boracalcic minerals. One embodiment includes the steps of producing borax by reacting carbon dioxide, sea water and a slurry of crude or beneficiated boracalcic ores in the presence of ammonia and the step of reacting calcined and slaked calcium oxide and ammonium chloride in water solution to produce calcium chloride.

6 Claims, 4 Drawing Figures

PROCESS FOR TREATING BOROCALCIC ORES

BACKGROUND OF THE INVENTION

1. Field of the Invention

Methods and apparatus for treating substantially water insoluble borocalcic ores.

2. Description of the Prior Art

Prior art methods have been proposed for treating borocalcic ores to obtain soluble boron values therefrom. These methods generally teach extraction by acid or alkali media and direct conversion to the boron alkali or acid salt or solution, or a subsequent conversion step to the alkali metal salt. Generally exemplary of the state of the art are U.S. Pats. numbered 2,776,186 and 3,018,163.

SUMMARY OF THE INVENTION

The invention is a method for treating substantially water-insoluble borocalcic ores with sea water and carbon dioxide to produce borax. One embodiment of the method includes the steps of mixing ammonia, carbon dioxide, borocalcic ores and sea water to obtain borax, ammonium chloride and calcium carbonate. Calcium carbonate is removed from the reaction, calcined, and the calcium oxide produced from the calcining step is hydrolyzed and mixed with the ammonium chloride solution from the borax forming step to produce calcium chloride.

In certain embodiments of the process, borocalcic ore, sea water, and carbon dioxide are reacted to form borax and boric acid in solution and calcium carbonate is removed from the solubilization reaction for later conversion to calcium chloride. Ammonia, carbon dioxide and sea water are mixed to yield a solution containing $Na_2CO_3$, $NaHCO_3$, $NH_4HCO_3$, and $NH_4Cl$ as well as impurities from sea water, and the solutions mixed with the solubilized boron values to convert substantially all the dissolved boron values to borax.

The present invention produces borax directly from borocalcic ore by utilizing carbon dioxide to solubilize the ore and by utilizing sea water, or sodium chloride dissolved in water, as the principal source of sodium ion external to the borocalcitic mineral in the conversion. The calcium ion to produce calcium chloride is obtained from the borocalcic ore in the solubilization step.

BRIEF DESCRIPTION OF THE DRAWINGS

A presently preferred embodiment of the invention is shown in the drawings, wherein.

DESCRIPTION OF THE PREFERRED EMBODIMENT

The chemistry of one embodiment of the invention is as follows:

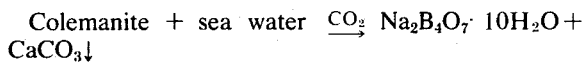

Colemanite is thus converted directly without intermediate steps to sodium tetraborate without the addition of expensive basic sodium ion donors such as sodium carbonate, sodium bicarbonate or sodium hydroxide. The invention utilizes sea water, or sodium chloride dissolved in water, as the principal source of sodium ion external to the borocalcic mineral. This reaction may be carried out in well know conversion equipment, such as ordinary gas sparging reaction vessels. The improvement is the novel use of sodium chloride as sodium ion donor in combinatin with the carbon dioxide solubilization of borocalcic ores to directly produce sodium tetraborate decahydrate, or borax.

The chemistry of another embodiment of the invention is as follows:

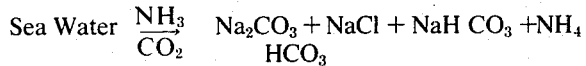

1

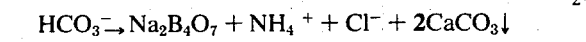

2

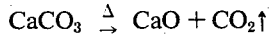

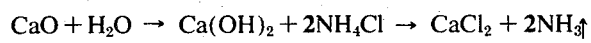

3

$$CaO + H_2O \rightarrow Ca(OH)_2 + 2NH_4Cl \rightarrow CaCl_2 + 2NH_3\uparrow$$

4

The net effect of the reactions as shown above is:

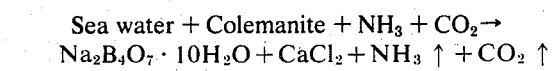

Colemanite is thereby converted to borax and calcium chloride, with ammonia and carbon dioxide recycled through the process to be used again for further conversion of borocalcic mineral. It is to be understood that colemanite, ulexite, and other substantially water insoluble borocalcic minerals may be converted to borax by the described embodiments of present invention. Usually, borocalcic minerals are found with some degree of magnesium substitution in the crystal lattice of the mineral. Each mole of ulexite, $NaCaB_5O_9 \cdot H_2O$ would, of course, require roughly half the sodium ion donors that colemanite would require, and could only produce half as much calcium chloride, assuming no other source of calcium in the reactants, as each mole of colemanite.

Figure 1:
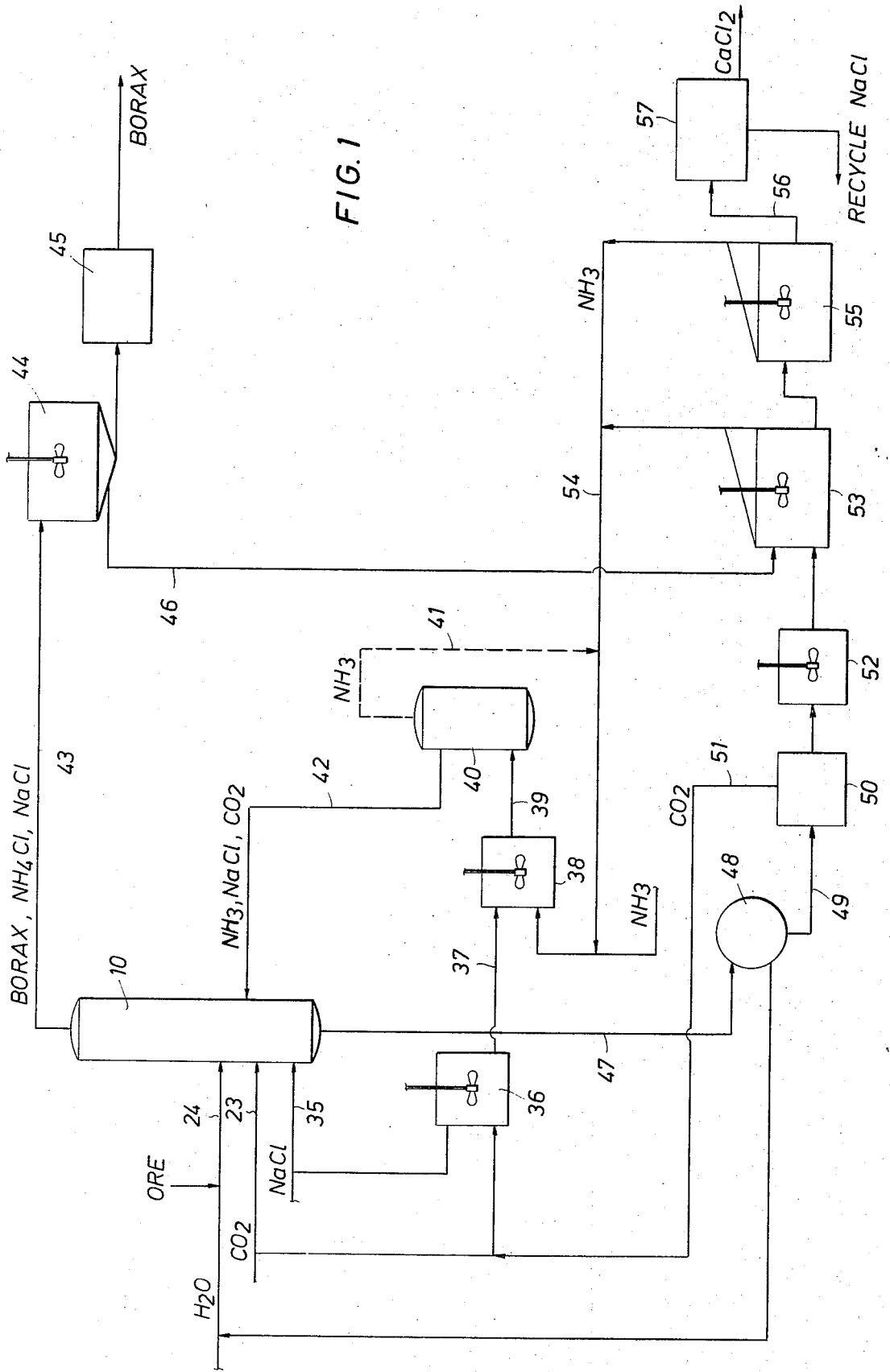
FIG. 1 is a schematic drawing showing one embodiment of the process for treating borocalcic ores.
Figure 2:
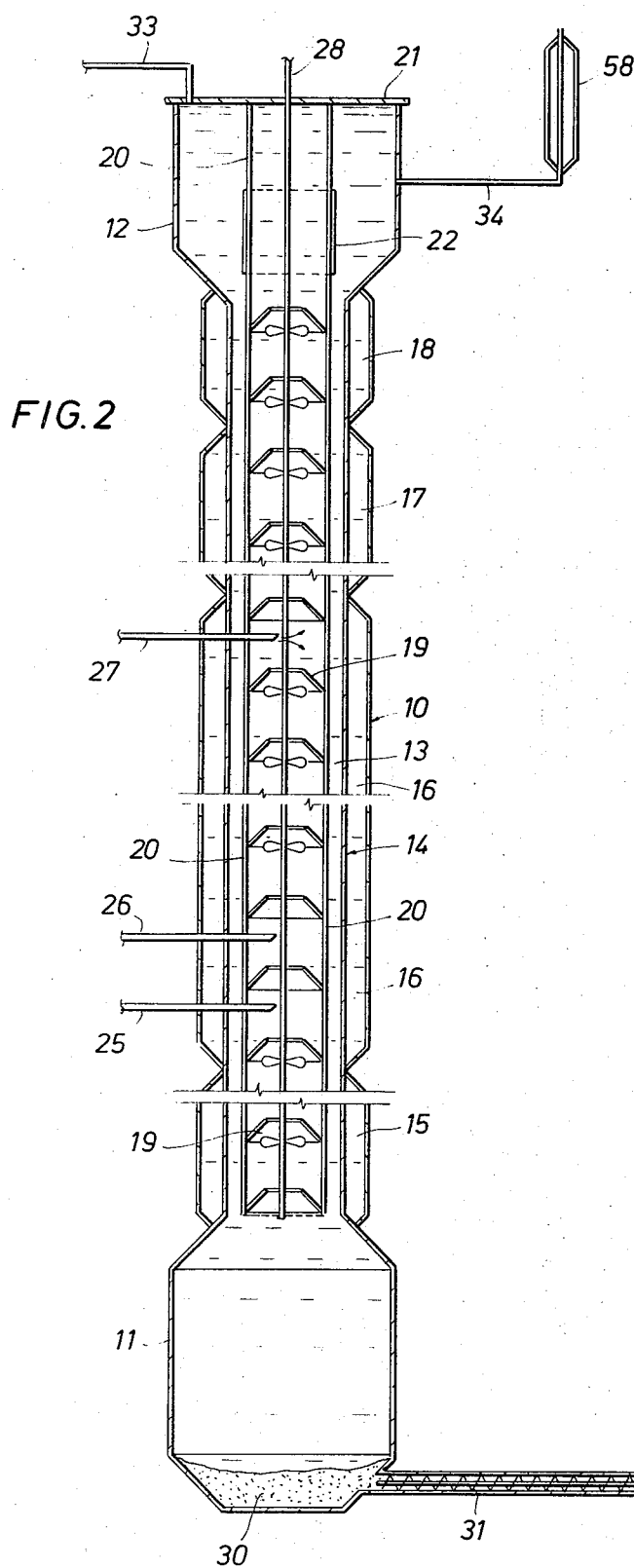
FIG. 2 is a schematic side elevation view of a reactor for use in the process.

Referring now to the drawings, FIG. 2 shows the inventor's presently preferred design of a reactor 10 for use in the process generally shown in FIG. 1. The reactor 10 is a generally cylindrical structure with a bottom enlargement 11 and top enlargement 12 therein. Inner chamber 13 within the cylindrical portion 14 includes various heating zones, the temperatures of which are controlled by the steam and water jackets 15, 16, 17, 18 disposed thereabout. Temperature is relatively cool in the area of heating jacket 15 in a lower portion of cylindrical portion 14 and increases to a maximum temperature at heating jacket 18 and an upper portion of cylindrical portion 14.

Figure 3:
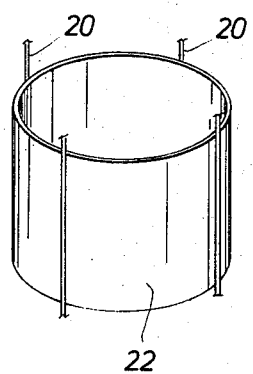
FIG. 3 is an isolated detailed view in perspective of a cylindrical baffle which is used in an upper zone of the reactor shown in FIG. 2.
Figure 4:
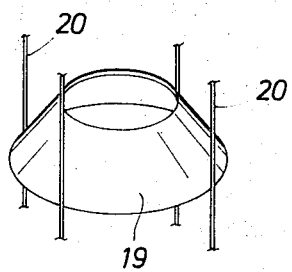
FIG. 4 is an isolated detailed view in perspective of one of the frusto-conical baffles used in the reactor shown in FIG. 2.

Disposed along inner cylinder 13 is a plurality of frusto-conical baffles 19, detail of which is shown in FIG. 4. The baffles are supported within inner cylinder 13 by appropriate support members 20 depending from the top 21 of reactor 10. Support members 20 also support a cylindrical baffle 22 within enlargement 12, detail of which is shown in FIG. 3. Cylindrical baffle 22 provides an area of relative quiescence in enlargement 12 for the liquids which fill reactor 10 in all the areas of enlargements 11 and 12 and cylindrical portion of 14.

Reactants of the process enter at the entry conduits 25, 26, 27 into inner chamber 13 of cylindrical portion 14. In the present embodiment, sea water which has been concentrated by evaporation enters through entry conduit 26, the condensate from the evaporation of the sea water which has been amoniated and carbonated enters through entry conduit 25. An agitator 28 driven by appropriate drive means (not shown) is supported within reactor 10 and provides slight upward movement to the contents of inner cylinder 13 which is in substantially unobstructed fluid communication with enlargements 11 and 12 of reactor 10.

Sea water condensate containing carbon dioxide and ammonia enters entry conduit 25 and is propelled gently upwardly past baffles 19 and is intimately mixed with the concentrated sea water entering entry conduit 26. The two mixed streams continue upward within cylindrical portion 14 and are mixed with a slurry of colemanite or other borocalcic ore entering entry conduit 27. Solubilization of the boron values in the colemanite continues as the three mixed streams continue up reactor 10. Residence time of the reactants may be of any suitable duration, depending on temperature of the reactor, the particular ore being processed and the degree of completion desired for the reaction. For example, heating jacket 15, covering about the lower 40 percent of surface of cylindrical portion 14 could maintain a heating zone (I) in reactor 10 at a temperature of 110°F and heating jacket 16 could maintain a heating zone (II) 160°F from about 40 percent of reactor 10 height to about 65 percent of reactor height. Heating zone (III), from about 65 percent of reactor 10 height to about 90 percent of reactor height, would be controlled by heating jacket 17 at about 175°F and heating zone (IV) would be maintained in the upper 10 percent of reactor 10 by heating jacket 18 at about 190°F. The chemistry of the reaction taking place in reactor 10 is shown in reaction (2) above.

As boron values are solubilized during movement of the reactants up reactor 10, calcium carbonate precipitate formation and precipitation also begin in inner chamber 13. The precipitate gravitates downwardly into bottom enlargement 11 and is shown mixed unreacted or unconverted ore and gangue, finally settling to form a sludge 30 along a bottom portion of enlargement 11. Suitable transferring means, such as a screw conveyer 31, with an appropriate motor 32, conveys the sludge to another portion of the process, for further processing, to be described hereinafter.

The solublized boron values, sodium chloride and ammonium chloride, along with any gas liberated from the liquid, proceed upwardly through cylindrical portion 14 of reactor 10, and eventually reach top enlargement 12. Any gases which may have been liberated during the solubilization reaction exit top enlargement 12 through a gas conduit 33. Cylindrical baffle 22 assists in maintaining a relatively quiescent zone within top enlargement 12, and the liquid products are withdrawn from top enlargement 12 by a product line 34 to be further treated as set out below.

In FIG. 1, a slurry of borocalcic ore in water (or recycled water containing some sodium chloride) enters reactor 10 through entry conduit 24. Water containing sodium chloride, or sea water, may be added directly into reactor 10 through an entry conduit 35 or may be added into an agitating tank 36 to be mixed with carbon dioxide. Carbon dioxide may also be sparged directly into reactor 10 through entry conduit 23 to assist in solubilization of the ore. The carbonated mixture then flows through a conduit 37 and into the ammonia mixing tank 38. The carbonated sea water is then mixed with ammonia and transferred by way of a conduit 39 into a heated vessel 40 for final mixing preparatory to entering reactor 10. In heated vessel 40, some unadsorbed gases may be expelled by way of line 41 to be recycled to ammonia mixing tank 38. The mixture from heated vessel 40 is transferred by way of a liquids line 42 into reactor 10 to be mixed with sea water and borocalcic ore, and in some cases, $CO_2$ sparged directly into reactor 10 by entry conduit 23.

Solubilized boron values along with ammonium chloride and sodium chloride solution are withdrawn from an upper portion of reactor 10 through a product line 43 and into a fractional crystallization tank 44. Borax is fractionally crystallized from the solution in fractional crystallization tank 44. Crystals of borax are then redissolved and recrystallized after transfer to a tank 45 and recovered as borax, or sodium tetraborate decahydrate. The filtrate from the fractional crystallization of borate is withdrawn from fractional crystallization tank 44 through a conduit 46 to be used as described hereinafter.

Insoluble carbonate precipitates and gangue containing the unconverted borocalcitic ore components are withdrawn from the lower portion of reactor 10 through a conveyor conduit 47 and into a dewatering vessel 48. The dewatered precipitate and gaugue are then transferred by a line 49 to a high temperature calcining vessel 50 and heated to 900°–1100°C to drive off carbon dioxide and form solid calcium oxide and magnesium oxide, if magnesium carbonate is present in the precipitate. The carbon dioxide is removed from calcining vessel 50 by a $CO_2$ recycle line 51 and returned for use in an earlier stage of process. Calcium oxide with the calcined sludge is then transferred to an appropriate mixing vessel 52 to be mixed with water, thereby forming calcium hydroxide as shown in reaction (4) above.

The calcium hydroxide from mixing vessel 52 is then transferred to a mixing tank 53 to be heated and mixed with the liquid containing ammonium chloride and sodium chloride from fractional crystallization tank 44. The two streams are mixed, ammonia is evolved, and calcium chloride is formed as shown in the righthand portion of equation (4) above. The ammonia formed is withdrawn to the ammonia recycle line 54, to be recycled to an earlier stage of the process. The partially reacted streams are then withdrawn from a lower portion of mixing tank 53 and allowed to complete the calcium chloride forming reaction in a heated secondary mixing tank 55. Again, ammonia is withdrawn from an upper portion of secondary mixing tank 55 to be recycled to an earlier stage of the process. The liquid, containing principally dissolved calcium and sodium chloride, is withdrawn from secondary mixing tank 55 by a conduit 56 and sodium chloride is fractionally crystallized for removal from the system or recycle in a fractional crystallization vessel 57 along with unreacted ore and gangue for disposal or partial recycle to reactor 10.

The very soluble calcium chloride is then crystallized from the remaining liquid from fractional crystallization vessel 57 and recovered after purification as solid calcium chloride crystals.

Another embodiment of the process for making borax and calcium chloride from borocalcic minerals may be accomplished in stepwise fashion. Rather than a single reactor, which produces borax directly, separate vessels may be utilized for different phases of the process. For example, ammonia and carbon dioxide may be mixed with evaporation-concentrated sea water to obtain a mixture of ammonium chloride, sodium bicarbonate, ammonium acid carbonate, sodium carbonate and unreacted sodium chloride and sea water impurities. In another reactor, borocalcic ore in water slurry may be solubilized by bubbling carbon dioxide therethrough at an elevated temperature, and boric acid and some borax may be obtained in the solution. Insoluble carbonate precipitates of calcium and magnesium, would, of course, be obtained as in the direct production of borax.

The ammoniated and carbonated sea water and the products of the borocalcic ore solubilization would then be mixed, yielding borax, sodium chloride and ammonium chloride, all in solution. Borax would then be fractionally crystallized from the solution leaving ammonium chloride and sodium chloride in solution.

The insoluble carbonate precipitates would be calcined as in the previously described embodiment and the carbon dioxide obtained from the calcining step would be recirculated for use in the process. The calcium oxide would then be mixed with water to yield calcium hydroxide, which would then be mixed with the sodium and ammonium chloride solution from which borax had been previously crystallized. The product of such mixture would be calcium chloride along with sodium chloride in solution and evolution of ammonia which could be recovered and recirculated to the process.

Typical examples of the process are shown below, with percentages and ratios based on weight, unless otherwise noted. Although the examples below utilize essentially pure colemanite, the invention is applicable to borocalcitic ores of varying calcoborate type and content.

EXAMPLE I

A sample of colemanite of the type from Boron, Kern County, California is crushed to three-sixteenths inch clear crystals and ground to pass 100 mesh. Purity checked by X-ray, spectographic and chemical analysis shows essentially pure colemanite ($Ca_2B_6O_{11} \cdot 5H_2O$). In a reaction vessel, 40 grams of the 100 mesh colemanite is dispersed in 400 milliliters of deionized water. While stirring, the temperature of the reaction vessel is elevated to 186°F, and maintained thereat using a constant temperature bath. $CO_2$ gas is then introduced into the system slowly through a fine sparger, and $CO_2$ bubbling is continued at that temperature for 6 hours. An aliquot sample captured after 6 hours showed that 82 percent of the colemanite had been solubilized. While continuing stirring, 40 grams of technical grade sodium chloride is added and the temperature maintained for 6 hours. The suspension is then filtered, the filtrate liquor evaporated to a minimal volume, cooled to 40°C, and seeded with a trace of borax crystals. The liquor is cooled to 5°C to aid crystallization and the crystallized product air dried and analyzed by X-ray diffraction techniques. The results of analysis show the solids crystallized from the liquor to be principally borax, $Na_2B_4O_7 \cdot 10H_2O$ contaminated with small amounts of sodium chloride. Wet chemical separation and analysis, after rapid recrystallization to separate sodium chloride, show the crystals recovered to be about 96 percent pure borax, and the yield of borax from colemanite to be about 75 percent.

As a comparative example, 40g. of the colemanite as used above is slurried with 400 ml. of water, 10g. of sodium chloride and 5g. of borax. $CO_2$ was sparged into the reaction vessel at 160°F. for a period of 6 hours. At the end of the 6 hour solubilization-conversion period, only 29 percent of the colemanite had been solubilized, and X-ray diffraction analysis shows the material crystallized from the solution to be primarily sodium pentaborate, $NaB_5O_8 \cdot 5H_2O$, admixed with small amounts of sodium chloride.

EXAMPLE II

A sample of 2 kilograms of sea water taken as an aliquot from 10 kilograms of sea water sampled at sea level, 10 feet and 30 feet depth, off Galveston Bay, Texas is found to be 23.5°/00 salinity and its composition is as follows in grams/kilogram:

| | |
|---|---|
| NaCl | 23.0 |
| $MgCl_2$ | 4.87 |
| $Na_2SO_4$ | 3.84 |
| $CaCl_2$ | 1.07 |
| KCl | 0.64 |
| $NaHCO_3$ | 0.19 |
| KBr | 0.09 |
| $H_3BO_3$ | 0.03 |
| $SrCl_2$ | 0.02 |
| Others | 0.25 (including organics) |
| | 34.0 |

The 2 kilogram sample of sea water is filtered slowly through a 6 inch bed of charcoal, then rapidly evaporated at atmospheric pressure in a flask to 1000 grams of residual concentrate. The distillate is condensed to condensate, and is saved for use as process water. 112 grams of a colemanite sample essentially the same as that treated in Example I is dispersed to form a heavy slurry in 560 grams of the sea water condensate.

Ammonia and carbon dioxide from technical grade cylinders are sparge fed into 600 milliliters of fresh water until the ammonia content of the water is 15 grams and the carbon dioxide content is 37 grams. The solution, containing ammonium acid carbonate, ammonium hydroxide, carbonic acid, with some ammonia and carbon dioxide, is pumped into a reactor of the type shown in FIG. 1 at entry conduit 25, which is one baffle 19 below entry conduit 26 for the sea water concentrate. Both entry conduits are in heat zone (I) which, except for the cooling effect of the entry liquids into the zone immediately surrounding those conduits, is maintained at 110°F. The entry conduits are located approximately one-third of the length of cylindrical portion 14 from the bottom thereof. The colemanitesea water concentrate slurry is introduced at a point located about 60 percent of the way up cylindrical portion 14 of reactor 10 and is maintained at approximately 160°F. Agitator 28 propels the three streams of incoming reactants gently upwardly through inner chamber 13, past the series of baffles 19 into heat zones 3 and 4, maintained at about 175°F and 190°F, respectively.

The residence time of the feed solids and liquids to the reactor taken from entry conduit 27 to effluent of solids from screw conveyor 31 is adjusted to approximately 10 hours. The vapors emanating from gas conduit 33 are discarded in the pilot program rather than being recycled. Samples of the vapors from gas conduit 33 are principally water and ammonia.

The sludge 30 from enlargement 11 consists primarily of calcium carbonate and unconverted colemanite with lesser amounts of magnesium carbonate, sodium carbonate, sodium bicarbonate and sodium chloride. The solid sludge is centrifuged and the cake placed in a vessel to be calcined at about 1075°C. The carbonate, principally calcium carbonate, is converted to crude calcium oxide, mixed with colemanite and other impurities from the ore and sea water. The calcium oxide is then immersed in water, using the original sea water condensate, and slaked at ambient temperature for several days to form a calcium hydroxide-rich slurry.

The liquids withdrawn at product line 34, consisting of borax, ammonium chloride, sodium chloride and lesser amounts of potassium chloride and calcium chloride are immediately cooled to 130°F in heat exchanger 58. The solution is then separated by evaporation and fractional crystallization, utilizing the different temperature-solubility curve of borax as compared with the relatively constant temperature-solubility curves of sodium chloride and ammonium chloride. The crystallization of borax is conducted very slowly at 5°C, following which, the crude borax is then redissolved in condensate water and recrystallized to over 99 percent purity. The apparent molar conversion of borax as $Na_2B_4O_7 \cdot 10 H_2O$ from colemanite as $Ca_2B_6O_{11} \cdot 5 H_2O$ is about 96 percent by weight.

The calcium hydroxide-rich slurry produced by water slaking of the calcined sludge is combined with a slight stoichiometric excess of the ammonium chloride-sodium chloride filtrate from the first borax crystallization step, with moderate heating while stirring in a flask. The vapors, which could be recovered for recycle in a continuous process, are tested periodically for ammonia until the ammonia odor is no longer detected and at that point the contents of the flask are filtered to remove the gangue. The filtrate is evaporated until crystals of sodium chloride begin to precipitate, then the solution is quickly cooled and the resultant sodium chloride solids filtered from the mixture. The filtrate is removed and evaporated slowly to dryness, and chemical analysis shows the evaporated cake to be about 71 percent calcium chloride, 1 percent sodium chloride and 27 percent water. Conversion of calcium hydroxide to calcium chloride in this example is approximately 54 percent with approximately equivalent conversion of ammonium chloride to ammonia.

EXAMPLE III

A sample of sea water taken just below surface level and filtered through a coarse filter, is analyzed and found to conform closely to dehydrated sea water salt (ASTM-D-1141-52). Heat is applied to rapidly evaporate the crudely filtered sea water until sodium chloride is about 25.0 percent by weight of the mixture, at which point evaporation is continued slowly until sodium chloride begins to crystallize. Heat input is then stopped, and technical grade ammonia is sparged into the concentrated mixture for about 15 minutes. Then carbon dioxide is sparged into the ammoniated mixture until crystals of crude sodium bicarbonate precipitate in an amount believed adequate for the next step. Recovery of crystals is stopped short of complete conversion, but could be continued to conversions of about 75 percent or higher. The crude crystalline precipitate is analyzed to contain 60–74 percent $NaHCO_3$, 15 percent $NaCl$ and 5–25 percent $Na_2CO_3$, with the remainder $NH_4HCO_3$, $MgHCO_3$, and $MgCl_2$. The crude sea water precipitate is separated from the mother liquor by filtration, dried to 50 percent solids and the filter cake set aside.

Using a constant temperature bath, 200 grams of colemanite treated as in Example I is added to 1000 milliliters of water and heated to 160°F. Carbon dioxide is sparged through a fine pore sparger for 7 hours at 160°F, and at the end of that period, 448 grams of the crude cake from the water precipitation step at 50 percent solids is added to the solubilized colemanite mixture and stirring continued for an additional 3 hours at 160°F. The sludge at the bottom of the reaction vessel is filtered from the soluble products. The solids from the reactor bottom are found to consist primarily of residual colemanite, calcium carbonate and some magnesium carbonate. The liquor from the reactor is cooled slowly to 5°C and borax fractionally crystallized. The crystallized borax is then redissolved and recrystallized to over 99 percent purity. The 100.5 g. of borax obtained from the final crystallization is shown to contain 17.0 percent $Na_2O$, 38.4 percent $B_2O_3$, and 0.10 percent iron, magnesium and other trace impurities. Hence, the apparent molar conversion of borax as $Na_2B_4O_7 \cdot 10H_2O$ from colemanite as $Ca_2B_6O_{11} \cdot 5H_2O$ is 96 percent by weight.

The mother liquor of the sea water ammoniation step and the sludge, which has been calcined and slaked as in Example II, are mixed, the sodium chloride crystallized out, and the filtrate evaporated to dryness to produce a calcium chloride cake. Conversions to calcium chloride are approximately the same as Example II.

It is to be understood that the various processing parameters will vary, dependent upon the composition and quality of the ores being processed and economic considerations such as the cost of energy for heat and availability of processing reagents, without departing from the scope of the invention. For example, the sea water, or water containing sodium chloride, may be evaporated to a mineral content of from about 5 percent to about 30 percent for use in the process. Residence time and reagent addition sequence may be altered to fit particular processing conditions. The number of heat stages in a conversion reactor may be varied to utilize solubility differences of products and reactants, and crystallization steps may be varied depending upon the amount of reagents to be recycled in the process and the particular ore being processed.

Thus it can be seen that an improved process for treating borocalcic minerals has been shown. Further modifications and alternative embodiments of the invention will be apparent to those skilled in the art in view of this description. Accordingly, this description is to be construed as illustrative only and is for the purpose of teaching those skilled in the art the manner of carrying out the invention. It is to be understood that the form of the invention herein shown and described is to be taken as the inventor's presently preferred embodiment. Various changes may be made in the sequence of steps, processing parameters and particular reagents used. For example, equivalent reagents or materials may be substituted for those illustrated and described herein, sequences of steps may be reversed, and certain features of the invention may be utilized independently of the use of other features, all as would be apparent to one skilled in the art after having the benefit of this description of the invention.

What is claimed is:

1. A process for treating borocalcic minerals comprising:
   concentrating sea water by evaporation;
   adding an aqueous solution of $NH_3$ and $CO_2$ to said concentrated sea water;
   flowing a water slurry of borocalcic ore into an intermediate temperature zone of a single reactor having a plurality of heating zones varying from about 110°F. to about 190°F. to contact said concentrated sea water and said solution containing $NH_3$ and $CO_2$;
   mixing said borocalcic ore, said concentrated sea water, carbon dioxide and ammonia in said single reactor, said mixing step beginning at the lower temperature range of said zones and ending at the upper temperature range of said zones;
   removing calcium carbonate and gangue formed in said mixing step from a lower portion of said reactor;
   and, recovering a solution containing borax and ammonium chloride from said reactor.

2. The process as claimed in claim 1, including the additional steps of:
   calcining said calcium carbonate to produce calcium oxide and carbon dioxide;
   separating said borax from said solution containing borax and ammonium chloride;
   reacting said calcium oxide from said calcining step with ammonium chloride solution from said separating step, whereby calcium chloride is produced and ammonia is formed in solution;
   and, recovering crude calcium chloride from said solution containing ammonium chloride and calcium chloride.

3. The process as claimed in claim 2, including the additional steps of:
   recycling said carbon dioxide from said calcining step to said mixing step;
   recovering said ammonia from said reacting step;
   and, recycling said ammonia to said mixing step.

4. The process as claimed in claim 2, wherein:
   said borax recovering step includes fractionally crystallizing said borax from said solution containing ammonium chloride;
   and, said calcium chloride recovering step includes crystallizing said crude calcium chloride from said solution containing calcium chloride and ammonium chloride.

5. A process for treating borocalcic minerals comprising:
   mixing ammonia, carbon dioxide and sea water to obtain ammonium chloride, sodium bicarbonate, sodium carbonate and ammonium acid carbonate;
   solubilizing borocalcic ore in water slurry by bubbling carbon dioxide therethrough, whereby boric acid and borax are produced in solution and calcium carbonate precipitate is formed;
   separating said calcium carbonate from said solution containing boric acid and borax;
   calcining said calcium carbonate to form calcium oxide and carbon dioxide;
   mixing the solution containing ammonium chloride, sodium bicarbonate, sodium carbonate and ammonium acid carbonate with said boric acid in the presence of said borax in solution;
   and, mixing the solution containing ammonium chloride and said calcium oxide to form crude calcium chloride and ammonia.

6. The process as claimed in claim 5, wherein:
   carbon dioxide and ammonia from said calcining and the third mixing step are recycled for use in said first mixing step.

* * * * *